(No Model.) 5 Sheets—Sheet 1.

F. W. G. BRUHN.
FARE REGISTERING APPARATUS FOR VEHICLES.

No. 485,529. Patented Nov. 1, 1892.

(No Model.) 5 Sheets—Sheet 2.
F. W. G. BRUHN.
FARE REGISTERING APPARATUS FOR VEHICLES.
No. 485,529. Patented Nov. 1, 1892.
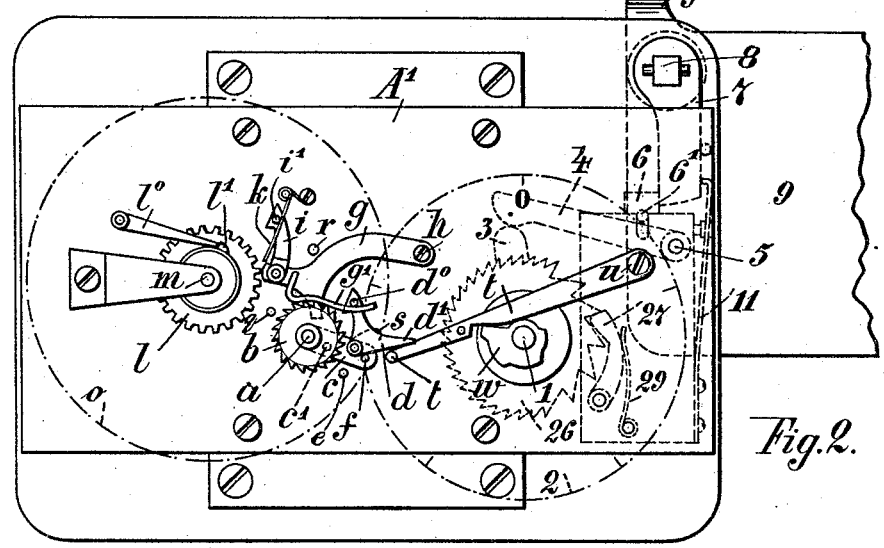
Fig. 2.
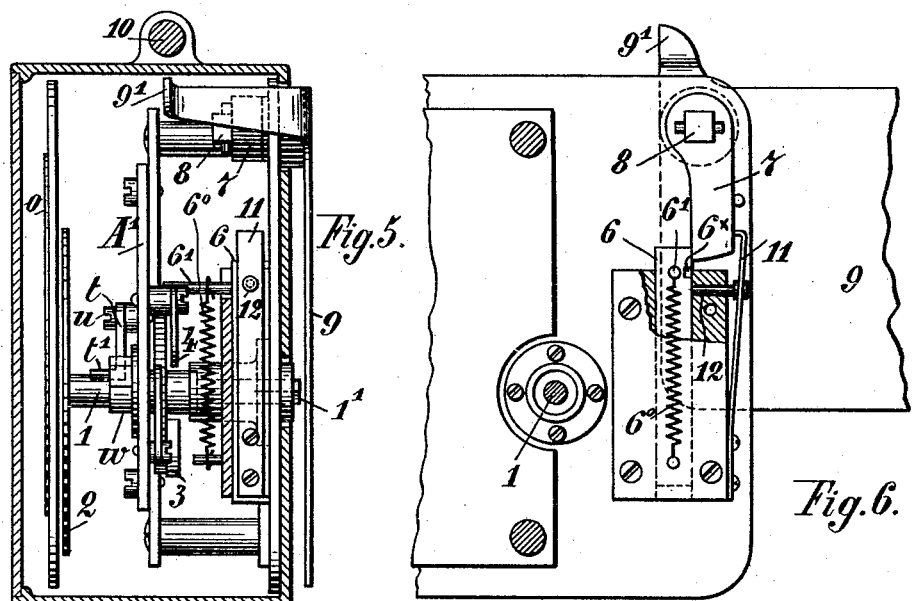
Fig. 5.
Fig. 6.
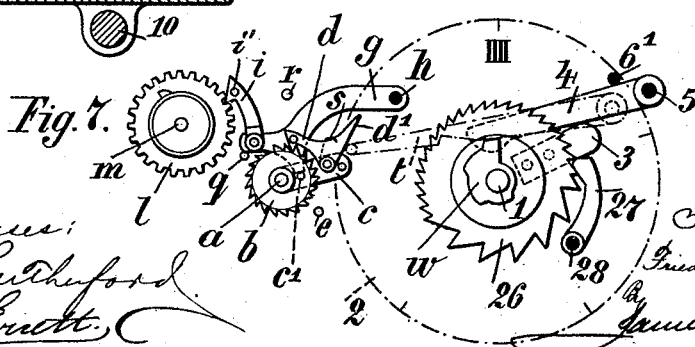
Fig. 7.
Witnesses:
J. A. Rutherford
Robt. Everett
Inventor:
Friedrich W. G. Bruhn
by James L. Norris
Attorney (No Model.) 5 Sheets—Sheet 3.
F. W. G. BRUHN.
FARE REGISTERING APPARATUS FOR VEHICLES.
No. 485,529. Patented Nov. 1, 1892.

(No Model.) 5 Sheets—Sheet 4.
F. W. G. BRUHN.
FARE REGISTERING APPARATUS FOR VEHICLES.

No. 485,529. Patented Nov. 1, 1892.

(No Model.)  F. W. G. BRUHN.  5 Sheets—Sheet 5.
FARE REGISTERING APPARATUS FOR VEHICLES.
No. 485,529.  Patented Nov. 1, 1892.
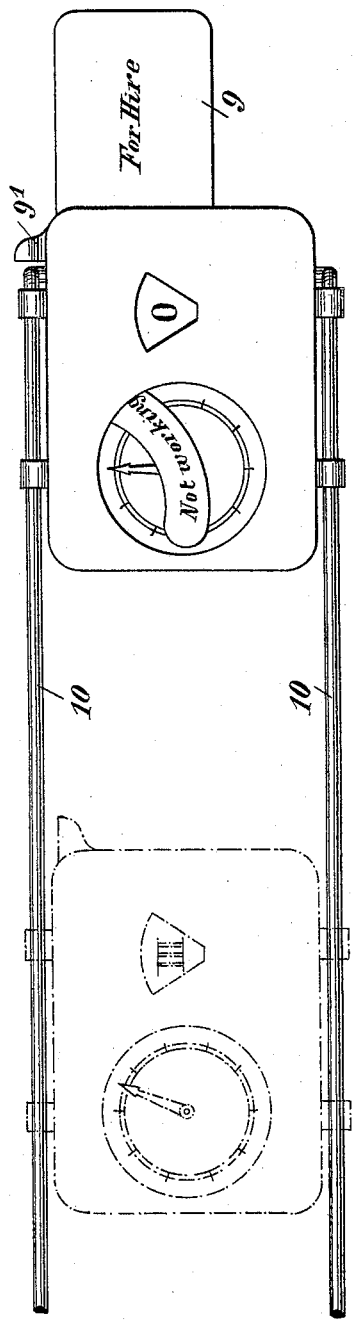

UNITED STATES PATENT OFFICE.

FRIEDRICH WILHELM GUSTAV BRUHN, OF HAMBURG, GERMANY.

FARE-REGISTERING APPARATUS FOR VEHICLES.

SPECIFICATION forming part of Letters Patent No. 485,529, dated November 1, 1892.

Application filed April 6, 1892. Serial No. 428,063. (No model.)

*To all whom it may concern:*

Be it known that I, FRIEDRICH WILHELM GUSTAV BRUHN, a subject of the German Emperor, residing at Hamburg, in the German Empire, have invented certain new and useful Improvements in Fare-Registering Apparatus for Vehicles, of which the following is a specification, reference being had to the accompanying drawings.

My invention relates to a fare-registering apparatus for vehicles in which the registration of the fare takes place solely in proportion to the time occupied on the journey. I provide special devices for enabling the fare-registering apparatus to be adjusted to different tariffs, according to the number of persons to be conveyed or according to the earlier or later time of day, and for protecting the passengers against the fraudulent tampering with the apparatus by the driver—for instance, during the time he has to wait. Such a fare-registering apparatus is represented in the accompanying drawings, in which—

Figure 1:
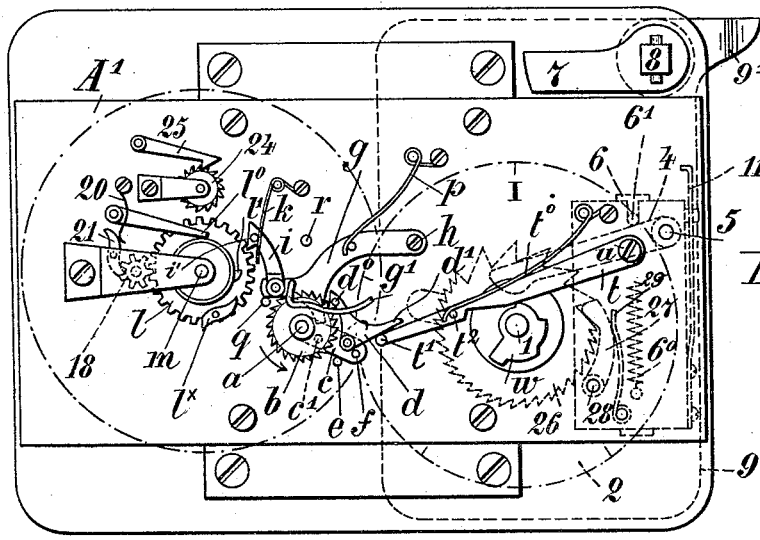
Figure 3:
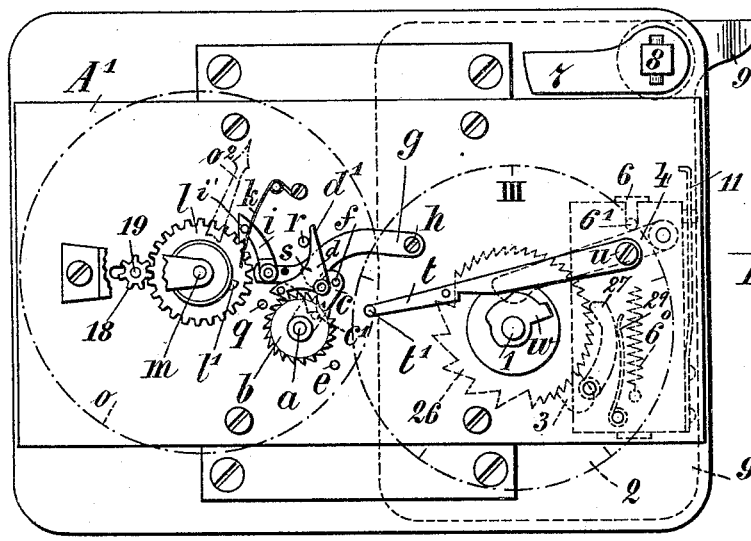
Figure 4:
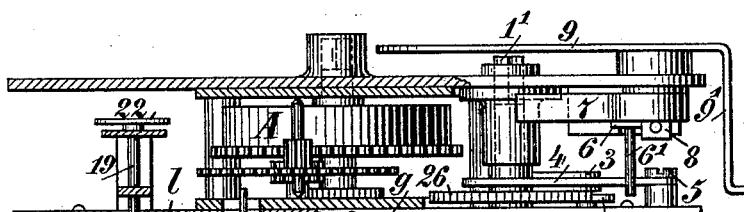
Figure 8:
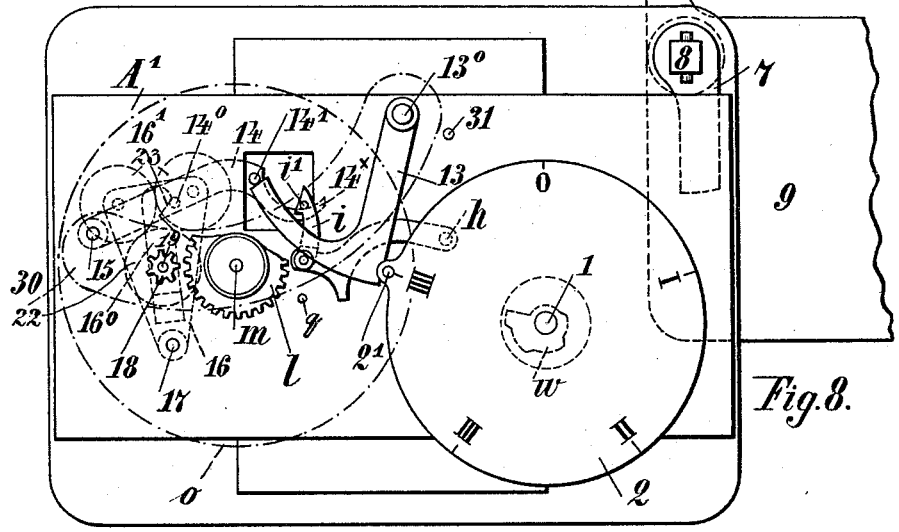
Figure 9:
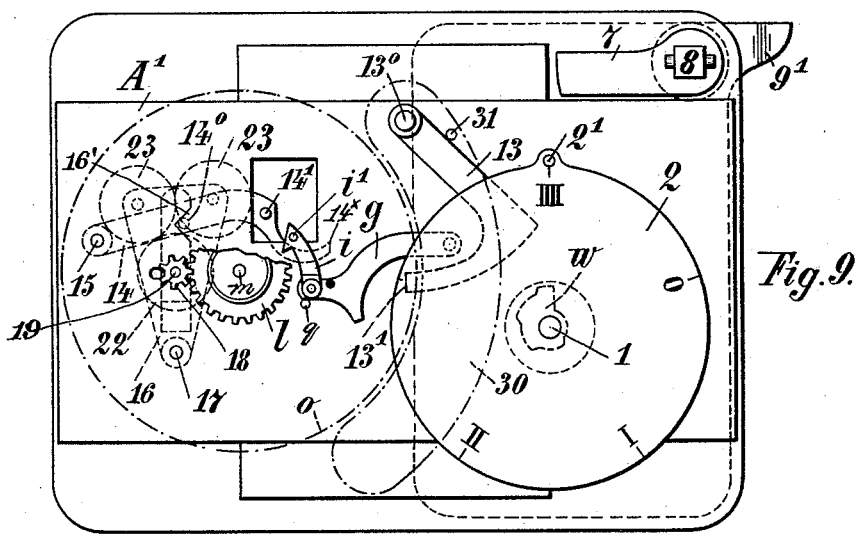
Figure 10:
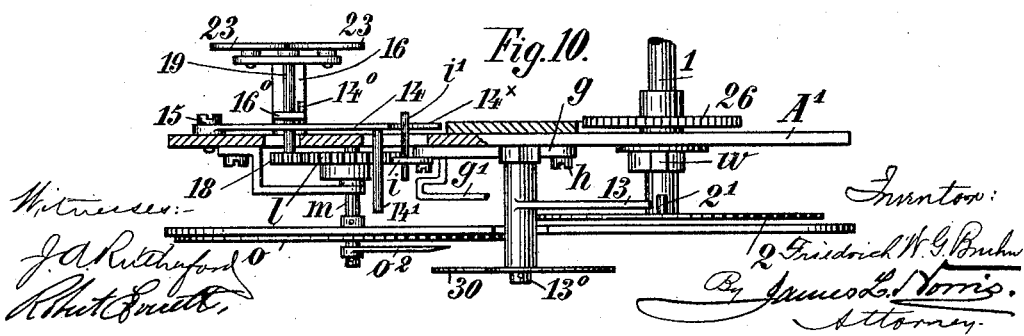
Figure 11:
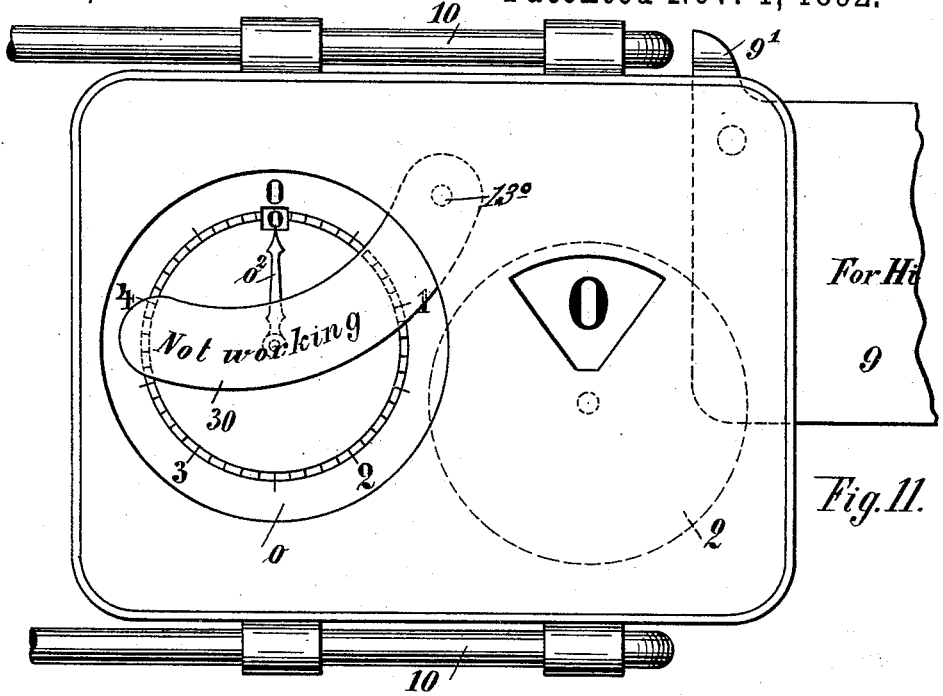
Figure 12:
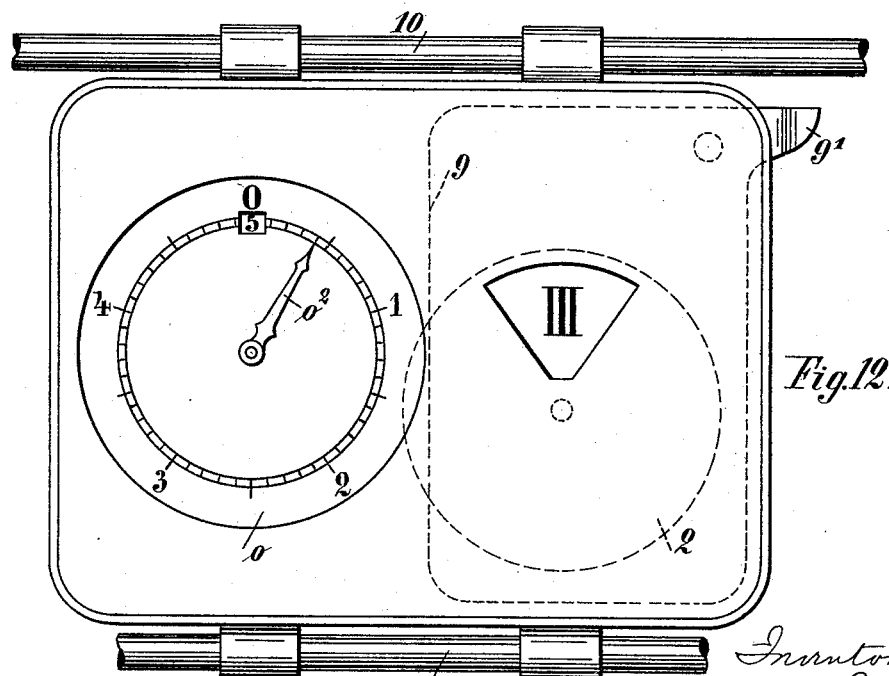

Figures 1 to 3 show front views of the improved apparatus in different positions, the casing and dial-plate being removed for the sake of clearness. Fig. 4 is a plan; Fig. 5, a transverse section of the fare-registering apparatus, while Figs. 6 and 7 illustrate details of the same. Figs. 8 to 10 show two front views and a plan of the device designed for changing the apparatus to different tariffs. Figs. 11 and 12 illustrate the means for applying the fare-registering apparatus to the vehicle, Fig. 11 indicating the position in which the apparatus is in a state of rest, and Fig. 12 the position in which it is ready for use. Fig. 13 shows, on a reduced scale, the outer view of the apparatus in its two terminal positions in the guide on the carriage, one of said positions being indicated in dotted lines.

In the improved fare-registering apparatus a clockwork $A$, Fig. 4, of any desired description, is used for continually turning a spindle $a$. A ratchet-wheel $b$ is secured upon this spindle $a$, which has an arm $c$ adapted to turn upon it, a pawl $d$ being pivoted to the free end of this arm. When the pawl $d$ engages with the ratchet-wheel $b$, the arm $c$ in the arrangement illustrated is caused to turn to the left, which arm, under the action of a helical spring (not shown) surrounding the spindle $a$, tends to turn in the opposite direction to that of the turning movement of the ratchet-wheel $b$. In state of rest the arm $c$ occupies the position indicated in Fig. 1, inasmuch as a stop-pin $e$, carried by the plate $A'$, counteracts the tendency of the spring pressing against the arm. When this arm $c$ has accomplished a certain portion of its turning movement to the left, a pin $c'$, projecting from the rear surface of the same, encounters an arm of the lever $g$, extending into its path, the said lever being adapted to oscillate upon a pin $h$, secured to the aforesaid plate $A'$. To the free end of this lever $g$ is pivoted a pawl $i$, which under the action of a spring $k$, bearing against a protruding pin $i'$, is continually forced between the teeth of a wheel $l$, arranged on a spindle $m$. The wheel $l$, which is provided with a number of teeth determined by the monetary system in use, is connected with the spindle $m$, so that the pointer $o^2$, fixed upon this spindle, will indicate upon a dial-plate $o$ up to a certain extent the amount to be paid by the passenger. In every turning movement of the lever $g$ the pawl $i$ will slide on the wheel $l$ over the top of the tooth, so that on the liberation of the said lever $g$, actuated by the clockwork through the medium of the ratchet-wheel $b$, spindle $a$, and arm $c$, it will, under the action of a turning-spring $p$, supported on a pin of the plate $A'$, cause the toothed wheel $l$ and the pointer $o^2$ to advance through one division. The turning movement of the lever $g$, taking place under the action of the spring $p$, is limited by a stop-pin $q$ on the plate $A'$. The lever is released from the said arm $c$, actuated by the ratchet-wheel $b$ on the spindle $a$ of the clockwork, by a stop-pin $r$ on the plate $A'$, which in the continued movement of the arm $c$ encounters the arm $d'$ of the pawl $d$, Fig. 3, thereby disengaging the latter from the ratchet-wheel $b$. When the pawl $d$ is thus disengaged, there will be no connection between the arm $c$ and the continuously-turning ratchet-wheel $b$. Accordingly the arm $c$ can yield to the action of the turning-spring as far as the stop-pin $e$, as the pawl $d$ by a spring $s$ and a bent arm $g'$, provided on the lever $g$, is prevented from engaging with the ratchet-wheel again during the return motion of the arm $c$ to its position of rest. This engagement can take place only when the arm $d'$ of the pawl encounters a stop $t'$. The position of this stop $t'$ may be changed in the manner hereinafter described, so that the pawl $d$ may, if necessary, again engage with the ratchet-wheel $b$ before the arrival of the arm $c$ in its position of rest, in order to be carried away again for actuating the lever $g$, pawl $i$, and toothed wheel $l$. This will occur oftener within a given time, according as the angle of oscillation of the arm $c$ with regard to the position of the said stop $t'$ is smaller. From this it also follows that a forward movement of the pointer $o^2$ will take place the less often if more teeth are passed over by the pawl $d$ in its return movement—that is to say, if the distance which it is carried by the clockwork in order to be released again is greater. The adjustable stop $t'$ is arranged on the free end of an arm $t$, which oscillates upon a fixed pivot $u$ on the front side of the plate $A'$, and is continually forced by a spring $t^\circ$, acting upon its projection $t^2$ against the periphery of a stepped cam-disk $w$. The latter, fixed upon a spindle 1, provided with a square 1' for a key, is of such shape that, according to the step determining the position of the arm $t$, the disengagement of the pawl $d$ from the continually-turning ratchet-wheel $b$ will take place sooner or later. This change of position of the arm $t$ can be observed by the passenger by the aid of a letter or inscription which a disk 2, secured upon the spindle 1, renders visible from the outside through an aperture, Figs. 11 and 12, provided in the casing. The passenger can thus also observe to which higher or lower tariff the fare-registering apparatus has been adjusted by the driver. On this also depends the number of the divisions of the dial-plate passed over by the dialwork within a definite space of time.

In the position indicated in Fig. 2, in which the fare-registering apparatus is not in connection with the driving clockwork and the dialwork and the tariff-changing mechanism are at zero, which is rendered visible from a distance by the position of a flag 9, a cam 3, secured upon the spindle 1, has moved an arm 4, held behind the plate $A'$ upon a pivot 5, to its upper terminal position, in which the projection 6' on a bar 6 bears upon it. This bar, guided in a fixed vertical path in the arrangement shown, serves in conjunction with a finger 7, which is firmly connected with the pivot 8 of the said signaling-flag 9, for blocking the latter. The flag 9 is of such a size that when turned down, Figs. 1, 3, 4, 5, 9, and 12, in which case the fare-registering apparatus is in the operative position, access to the square 1' of the spindle is prevented, on account of its being covered by said flag, so that the driver cannot fraudulently adjust the fare-registering apparatus to a higher tariff during the working. As, however, the casing of the fare-registering apparatus is adapted to be moved in the horizontal direction between guide-bars 10, fixed to the carriage, and a projecting nose 9' on the flag is arranged in the plane of the guide-path formed by said bars, a displacement of the flag (equivalent to putting the fare-registering apparatus in and out of operation) is only possible when the apparatus is shifted out of said guide-path 10, Figs. 2, 6, 8, 11, and 13, to such an extent that a turning movement of the flag can take place laterally to the driver's seat—that is to say, in a position which is noticeable by the passenger or the public. In such a movement of the flag 9 access is given to the square 1' for the key; but a pin 12, Fig. 6, connected with the spring 11 is simultaneously drawn back by the finger 7 from the path of the bar 6. The bar 6, thereby released and continually pulled downward by a spring $6^\circ$ is therefore locked by means of the said pin 12, adapted to be moved in a fixed guide, as soon as this pin has an opportunity for entering a recess $6^\times$ in the bar. Accordingly the latter will be disengaged only when the flag 9 is placed quite horizontal, and as the finger 7 in the latter part of its movement carries away the spring 11, it is only then possible to adjust to zero the disk 2, which renders the higher and the lower tariff visible and to put the apparatus out of operation. The driver cannot, therefore, stop the operation of the apparatus without putting the flag 9 in the position indicating that the vehicle is empty.

In the zero position of the tariff-disk 2 a stop-pin 2' (shown only in Figs. 8 to 10) comes into action. It moves an angular arm 13, pivoted at $13^\circ$ to the plate $A'$ from the position indicated in Fig. 9 to that shown in Fig. 8, in which the surface 13' of the same bears against a pin 14' of the arm 14, adapted to turn upon a pin 15, Fig. 10, behind the plate $A'$. A second pin $14^\circ$ on the latter acts upon an inclined surface 16', which forms part of a frame 16, capable of turning upon a pin 17 on the plate $A'$, while the horn $14^\times$ on the arm 14 is designed to catch underneath the pin $i'$ on the pawl $i$ in the passage from one terminal position, Fig. 9, to the other, Fig. 8, and to disengage this pawl from the toothed wheel $l$. Under the action of a spring (not shown) the frame 16 always tends to move in the direction toward a third spindle $m$, in order to cause the toothed pinion 18, which is fixed upon a spindle 19, supported in the frame 16, to engage with the toothed wheel $l$. The pinion 18, with its pawl 21, Fig. 1, acted upon by a spring 20, serves as a stop for the toothed wheel $l$, inasmuch as it prevents a return movement of the latter in the direction of a sliding spring acting upon the same. When, therefore, by the action of the arm 13 both the toothed pinion and the pawl $i$ are disengaged from the toothed wheel $l$ this wheel can yield to the action of the aforesaid spring sliding upon the spindle $m$ until its nose $l'$ strikes against a stop $l^\circ$, at which moment the fare-registering apparatus or the pointer $o^2$ will occupy its zero position. The said pinion 18, serving as a stop for the toothed wheel $l$, is used for transmitting the movement of the latter to a counter provided for facilitating the control of the apparatus by the owner of the vehicle, this counter comprising two wheels 22 23, supported in the frame 16.

In case a complete revolution of the pointer $o^2$ is not sufficient to indicate the full value of a journey I provide on the toothed wheel $l$ a carrying-pawl $l^x$, which on the completion of every revolution of this toothed wheel $l$ or of the pointer $o^2$ causes a wheel 24, stopped by a pawl 25, to turn one tooth, or a pointer arranged upon the axis of the same or a dial-plate to turn through a division corresponding to a higher monetary value. The wheel 24, similarly to the toothed wheel $l$, is fixed upon its axis and therefore on the disengagement of the pawl 25, effected by the arm 14, moves back simultaneously with the wheel $l$ to the zero position.

When the apparatus is out of action, the arm $t$ returns in the described manner to its position of rest, Fig. 3, so that the arm $c$, adapted to turn upon the spindle $a$ of the clockwork, can follow, as shown, as the pawl $d$ is disengaged from the ratchet-wheel $b$ by the stop-pin $r$, a premature engagement of the pawl with the ratchet-wheel being prevented by the pin $d°$, provided on the pawl and adapted to slide along an arm $g'$, Fig. 2.

For the purpose of rendering it difficult for the driver, at the expense of the owner of the vehicle, to tamper with the counter serving for the control of the apparatus by repeatedly lifting and lowering the above-mentioned arm $t$ by causing the second spindle 1 when the apparatus is in use to turn continuously or turn repeatedly to and fro, for instance, from the zero position, Fig. 2, of the cam-disk $w$ to the position Fig. 7 for the highest tariff in order to move the lever $g$, wheel $l$, and pinion 18, and therefore the controlling or counting wheels 22 23 past the highest number to be indicated by them either again to zero or to another number which is lower than the correct number, I use the following arrangement: Upon the aforesaid second spindle 1 is fixed a ratchet-wheel 26, (see Fig. 3,) of peculiar construction, a portion of the periphery of said ratchet-wheel being provided with large teeth and another portion provided with small teeth, which, engaging with a pawl 27, pivoted at 28, on the plate A', will enable, when the apparatus is in operation, a change from the lowest to the highest tariff and vice versa, but not from zero to the highest position or from the lowest tariff to the zero position, so that, for instance, when a change occurs during the journey in the number of the persons conveyed, a change in the fare can at any time be indicated by the driver if he draws the apparatus from its guide-path 10 to such an extent that the flag 9 passes to the position Fig. 2 or 11, so that the keyhole becomes free by being uncovered.

The ratchet-wheel 26 is provided at its periphery with a number of larger and smaller teeth with which the pawl 27 is caused to engage by the pressure of a spring 29. This pawl is of such a shape at the end engaging with the wheel that, although preventing an automatic movement of the ratchet-wheel 26, it can slide over the smaller teeth in the turning movement of this wheel in either direction, while within the arc of a circle occupied by the larger ratchet-teeth it permits the turning movement of the spindle 1 only in one direction. If, therefore, as in the arrangement represented, the steps of the cam-disk $w$ are properly arranged relatively to the teeth of the ratchet-wheel 26, the driver in order to put the tariff-disk on zero must always turn the spindle 1 in the direction in which the adjustment of the apparatus to a higher tariff is effected. Accordingly, if the key for effecting the change of the tariff or the keyhole therefor is arranged as in apparatus of the same class, so that without being removed from the keyhole it can perform not a complete turn, but only a turning movement, whereby the cam-disk is caused to move forward or backward one step within the positions for the highest and lowest tariff, the intention to change the position of the controlling-wheels for purposes of fraud would be so extremely troublesome to carry out and would take so much time that the possible gain would not have any proportion to the amount of trouble spent. This becomes evident when, as in the arrangement shown, the key has to be five times introduced into the keyhole and removed again from the same in order to turn the spindle once or turn the wheel $l$ one tooth farther in case the controlling-wheels are in gear. If, moreover, the counter provided for the control, and consisting of the wheels 22 23, is so arranged that it returns to zero only after it has passed beyond the maximum of the amount indicated by the same—for instance, ten thousand marks—the security of the owner of the vehicle against fraud on the part of the driver is proportionately increased.

Upon the pivot 13° of the arm 13 is usually fixed a sickle-shaped covering-plate 30 (marked with the legend "Not Working,") Figs. 11 and 13, in order to draw the attention of the passenger to the fact that the fare-registering apparatus has not been set in action if such be the case, the said covering-plate passing to the front of the dial-plate $o$ when the apparatus is put out of action. For this purpose the pivot 13° is provided with a spring, which is capable of causing the arm 13 and cover-plate 30 to return to the position of rest, Fig. 8, as soon as the nose 2' on the tariff-disk 2 ceases to act. This movement of the arm 13 is limited by a stop 31, provided on the plate A' and extending into the path of the arms 13.

What I claim is—

1. In a fare-registering apparatus, the combination of a clockwork A, the spindle $a$, actuated by the clockwork and having a ratchet-wheel $b$ secured thereon, the arm $c$, mounted on said spindle, the pawl $d$, pivoted to said arm and adapted to engage the ratchet-wheel, the lever $g$, provided with a spring $p$ and extended into the path of a pin $c'$, carried by the arm $c$, the pawl $i$, pivoted to the lever $g$ and provided with a pin $i'$, the spring $k$, bearing on said pin, the toothed wheel $l$, the spindle $m$, provided with pointer $o^2$, and the dial-plate $o$, substantially as described.

2. In a fare-registering apparatus, the combination of the spindle $a$, having the ratchet-wheel $b$ secured thereon, the arm $c$, mounted on said spindle, the pawl $d$, carried by said arm and adapted to engage the ratchet-wheel, the fixed stop $r$, supported in the path of the pawl $d$ on one hand, the lever $t$, provided with a stop $t'$ on the other hand, and the stepped cam-disk $w$, substantially as described.

3. In a fare-registering apparatus, the combination, with the fixed guide-bars 10 to receive the casing of the apparatus, of the pivotally-supported signaling-flag 9, adapted to be turned down over the keyhole of the apparatus and provided with a nose $9'$ to engage one of the guide-bars and prevent the hoisting of the flag until the apparatus has been moved to a prescribed position on said guide-bars, substantially as described.

4. In a fare-registering apparatus, the combination of the fixed guide-bars 10, the stepped cam-disk $w$, the cam 3, connected with said disk, the signaling-flag 9, provided with nose $9'$ and finger 7, the bar 6, the spring 11, and the pin 12, substantially as described.

5. In a fare-registering apparatus, the combination, with the count-controlling mechanism, of the plate $A'$, the spindle 1, the ratchet-wheel 26, mounted on said spindle and provided with large teeth and small teeth, the pawl 27, pivoted to the plate $A'$ and provided with the spring 29, the stepped cam-disk $w$, and the arm $t$, substantially as described.

In testimony that I claim the foregoing as my invention I have signed my name, in presence of two witnesses, this 19th day of March, 1892.

FRIEDRICH WILHELM GUSTAV BRUHN.

Witnesses:
ALEXANDER SPECHT,
DIEDRICH PETERSEN.